(12) United States Patent
Frisch et al.

(10) Patent No.: US 6,409,208 B1
(45) Date of Patent: Jun. 25, 2002

(54) DETENT CONNECTION

(75) Inventors: Ralph Frisch, Mömbris; John-Oliver Derrick, Hettstadt, both of (DE)

(73) Assignee: TRW Automotive Safety Systems GmbH & Co. KG, Aschaffenburg (DE)

(*) Notice: Subject to any disclaimer, the term of this patent is extended or adjusted under 35 U.S.C. 154(b) by 0 days.

(21) Appl. No.: 09/675,605

(22) Filed: Sep. 29, 2000

(30) Foreign Application Priority Data

Nov. 15, 1999 (DE) .......................................... 299 20 024

(51) Int. Cl.[7] .............................................. B60R 21/16
(52) U.S. Cl. ..................... 280/728.2; 280/731
(58) Field of Search ........................... 280/728.2, 728.3, 280/731, 732

(56) References Cited

U.S. PATENT DOCUMENTS

| | | | |
|---|---|---|---|
| 5,167,427 A | * | 12/1992 | Baba |
| 5,445,409 A | * | 8/1995 | Abramczyk et al. |
| 5,474,323 A | * | 12/1995 | Davidson |
| 5,484,223 A | | 1/1996 | Saito |
| 5,511,819 A | * | 4/1996 | Spilker et al. |
| 5,816,608 A | * | 10/1998 | Tanabe |
| 5,829,777 A | | 11/1998 | Sakurai et al. |
| 5,876,060 A | | 3/1999 | Davidson et al. |

FOREIGN PATENT DOCUMENTS

| | | |
|---|---|---|
| JP | 07233805 A | 9/1995 |
| JP | 09079221 A | 3/1997 |

OTHER PUBLICATIONS

An advertising brochure of the firm of KEUCO dated 1994 disclosing a wall connection element with a base body to be screwed to a wall, and an element to be clipped on the base body.

* cited by examiner

Primary Examiner—Paul N. Dickson
(74) Attorney, Agent, or Firm—Tarolli, Sundheim, Covell, Tummino & Szabo L.L.P.

(57) ABSTRACT

A detent connection comprises two retaining parts, one of which is provided with at least one detent nose. The detent nose is designed such that on shifting of the two retaining parts relative to each other one of the retaining parts is arched by a force acting substantially perpendicular to a shifting direction before the detent nose latches in place. Further, a gas bag module is proposed which comprises such a detent connection.

8 Claims, 4 Drawing Sheets

DETENT CONNECTION

TECHNICAL FIELD

The invention relates to a detent connection, in particular for a gas bag cover of a vehicle occupant restraint system.

BACKGROUND OF THE INVENTION

A typical detent connection comprises two retaining parts, one of which is provided with at least one detent nose. The other retaining part in such detent connections usually comprises an opening. Latching the connection is then done by urging the two retaining parts together so that the detent nose is urged into place by the other retaining part until the opening coincides with the detent nose to thus enable it to latch into place. For the detent nose to be suitably movable it needs to be formed of a sufficiently thin material. This diminishes the strength of the detent connection, however. In addition there is a risk of the detent nose suffering a permanent deformation on snapping in or disengaging the connection, resulting in the nose no longer properly latching or even breaking away when next connected.

BRIEF SUMMARY OF THE INVENTION

The invention provides a detent connection which avoids the cited disadvantages and, in addition thereto, is easy and cheap to manufacture and put to use.

This is achieved in a detent connection which comprises two retaining parts, one of which is provided with at least one detent nose. The detent nose is designed such that on shifting of the two retaining parts relative to each other one of the retaining parts is arched by a force acting substantially perpendicular to a shifting direction before the detent nose latches in place. Thus, it is no longer necessary that the detent nose is configured flexible, it instead now being configurable correspondingly solid and rugged. The flexibility needed to latch the connection is produced by the arching of the retaining part.

DETAILED DESCRIPTION OF THE PREFERRED EMBODIMENT

Figure 1:
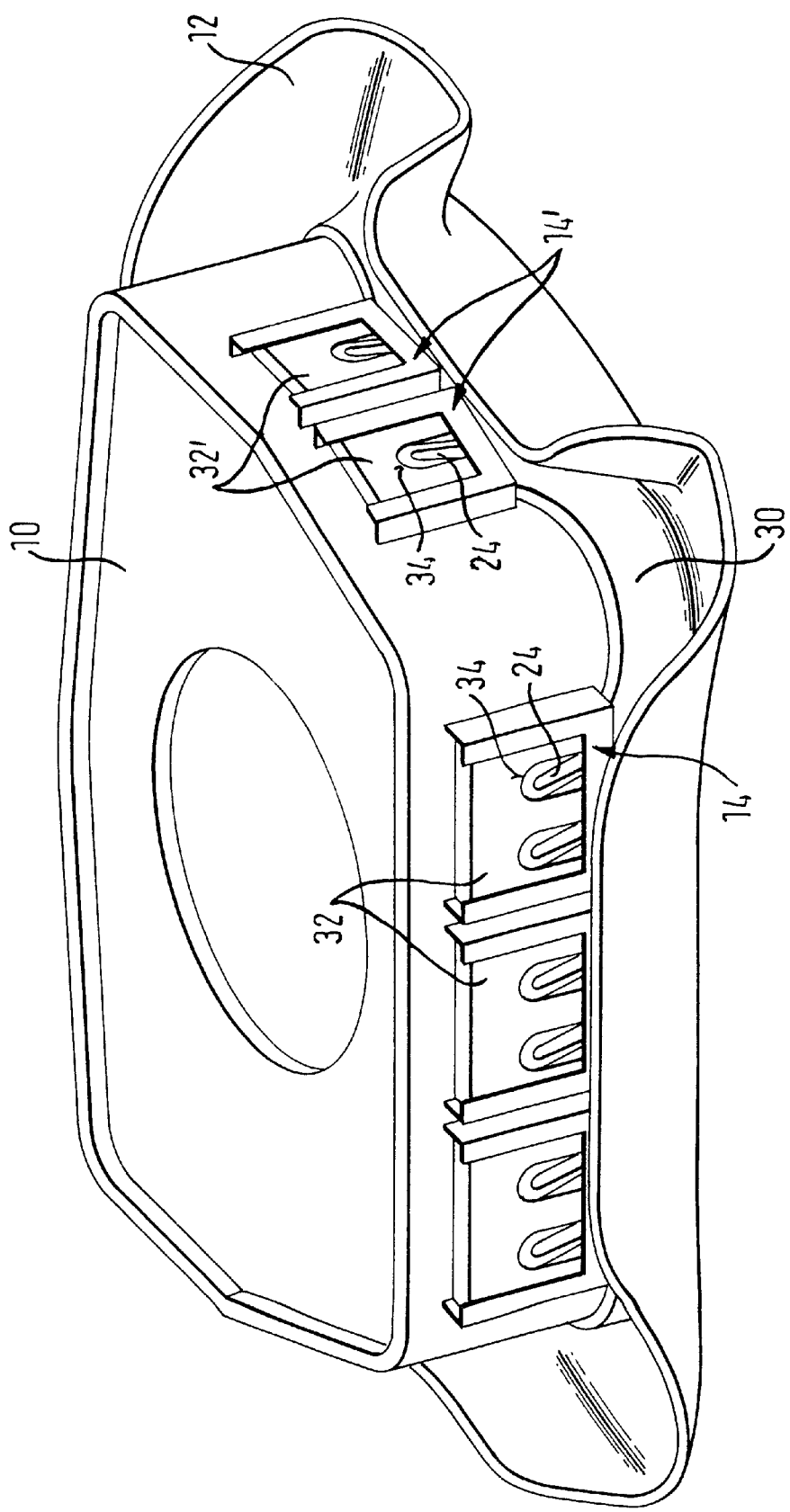
FIG. 1 is a view in perspective of a gas bag module comprising a detent connection in accordance with a preferred embodiment of the invention.

Referring now to FIG. 1 there is illustrated the gas bag module comprising a housing 10 and a gas bag cover 12. In this illustration the side of the housing 10 to be secured to the steering wheel is at the top; the side of the gas bag cover 12 facing the vehicle occupant is at the bottom.

The housing 10 is substantially cuboidal. Applied to the side surface areas of the housing 10 are retaining parts 14, 14'. The housing 10 may be configured as an injection molded plastic part with the retaining parts 14, 14' injection molded in the process to advantage.

Figure 2:
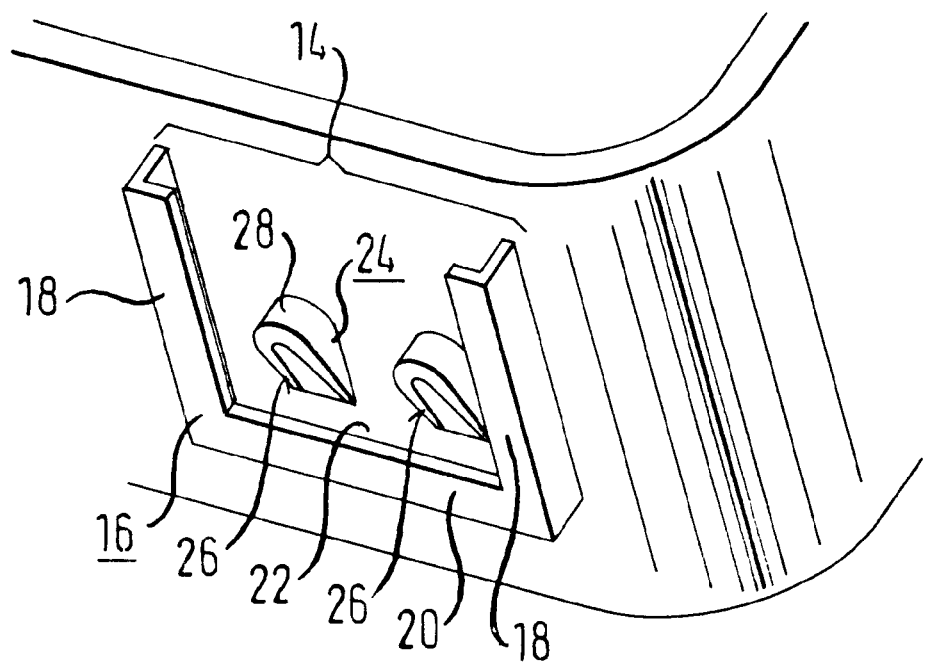
FIG. 2 is a detail of a retaining part of the gas bag module as shown in FIG. 1.

Referring now to FIG. 2, there is illustrated one of the retaining parts 14 in more detail. The retaining part 14 comprises a guide element 16 and two detent noses 24. The guide element 16 consists of two guides 18 of L-shaped cross-section and a cross-member 20. The guides 18 are fixedly applied to the housing by the end of their long legs, i.e., such that their short legs are opposite each other. At the end depicted at the bottom in the illustration, the short legs fare connected to each other by the cross-member 20. The ends of the guides 18 together with the cross-member 20 and the housing 10 thus form a passage 22. Configured between the two guides 18 at the housing 10 are two detent noses 24. The detent noses 24 are oriented parallel to each other and comprise a ramp face 26 and a flat rounded head 28. The ramp faces 26 of the detent noses 24 face the cross-member 20. The detent noses 24 are injection molded to the housing 10 as protuberances. Since they do not need to be movable, they feature no undercuts. This ensures cost-effective production since no complicated injection mold is needed. In addition thereto, the detent noses are rugged since they are connected to the housing by their full basic surface area.

Figure 3:
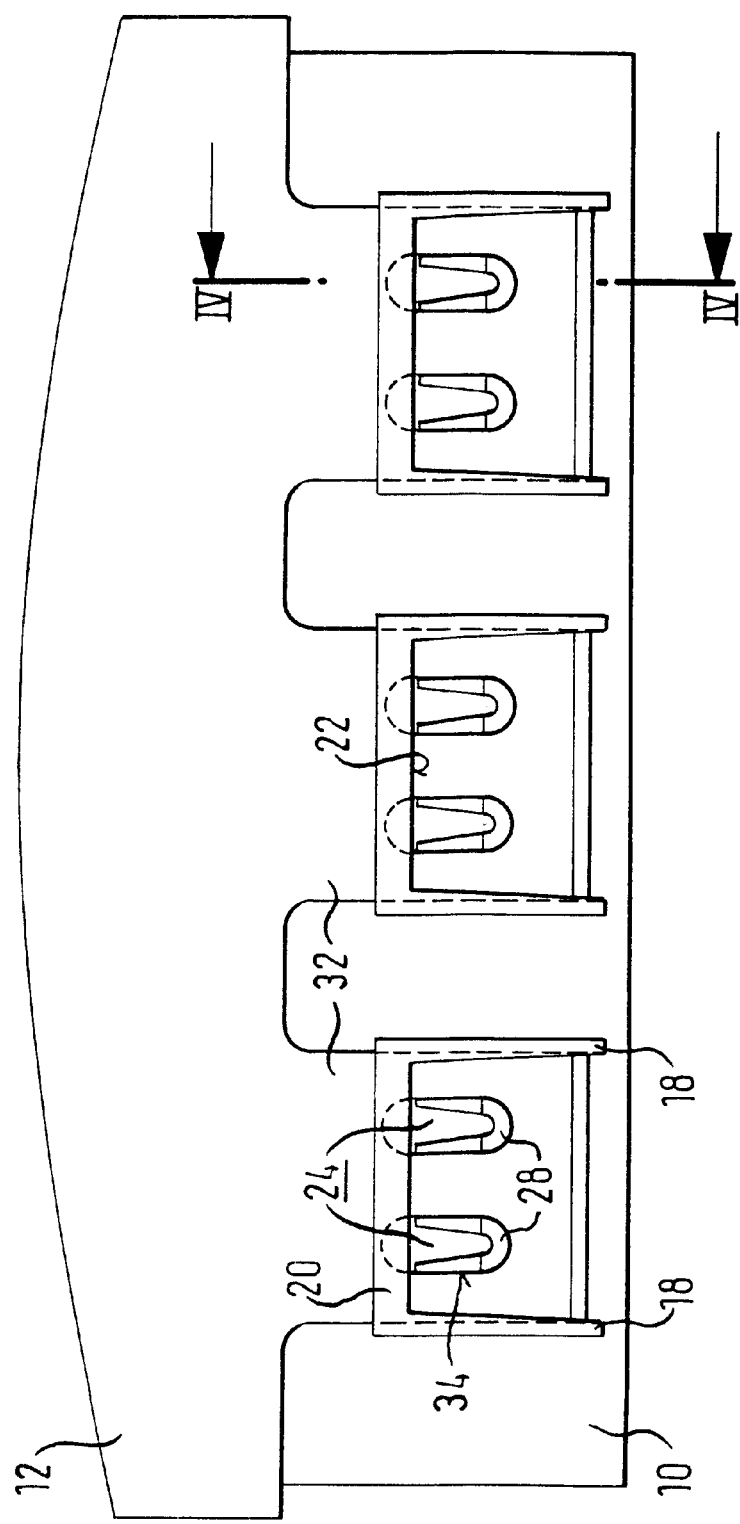
FIG. 3 is a side view of the gas bag module as shown in FIG. 1.

Referring now to FIG. 3 there is illustrated a better view of how the guides 18 are not oriented parallel to each other but converging in the direction toward the heads 28 of the detent noses 24, the short legs of the guides 18 thereby being tapered. It is evident from FIG. 1 that three such retaining parts 14 are applied to the longitudinal side of the housing 10. At the narrow side of the housing 10 two retaining parts 14' are applied, each of which is provided with one detent nose only. The same applies to the narrow side not evident from FIG. 1, whereas again three guide elements 14 each having two detent noses are applied to the likewise non-evident longitudinal side. It will be appreciated that the number of retaining parts per side and their nature, i.e. with one, two or more detent noses, is illustrated in this case merely by way of example and may be adapted to the particular application depending on the size of the housing and the connecting force needed.

Likewise evident from FIG. 1 is a bead 30 configured on the side of the gas bag cover 12 facing the housing 10. The gas bag cover 12 is applied to the housing 10 from underneath so that the bead 30 encompasses the bottom rim of the housing 10. Configured at the upper edge of the bead 30 are retaining parts in the form of tabs 32, 32'. These tabs 32, 32' extend through the passages 22 and along the guides 18 of the retaining parts 14, 14' on the housing 10. Openings 34 are formed in the tabs 32, 32' into which the detent noses 24 engage. Corresponding to the number of detent noses 24, two or one opening each is provided in the tabs 32, 32'. The gas bag cover 12 may be likewise injection molded in plastics material to advantage.

Figure 4:
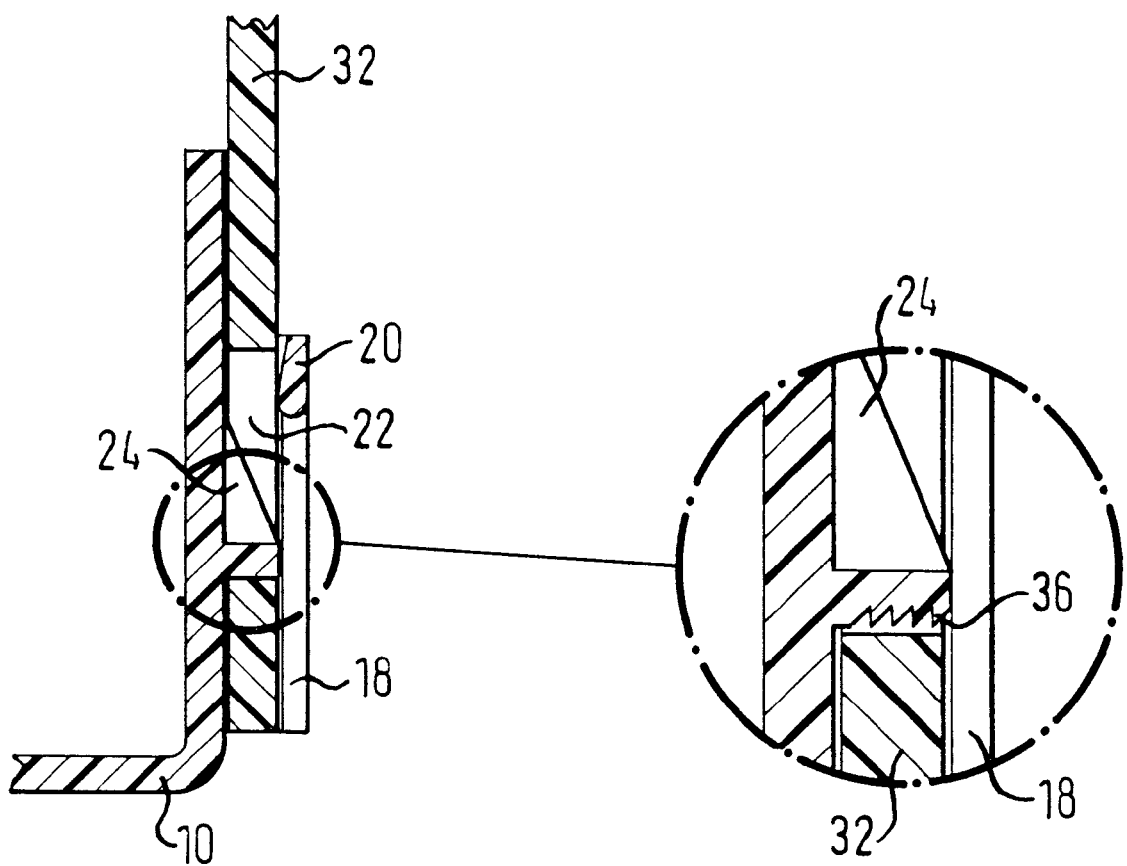
FIG. 4 is a section through the gas bag module taken along the line IV—IV in FIG. 3.

In assembly the gas bag cover 12 is fitted to the housing so that the tabs 32, 32' pass through the passages 22. In this arrangement, the tabs 32, 32' are guided by the converging guides 18 to correctly position the housing 10 and gas bag cover 12 relative to each other. On pushing in the tabs 32, 32', these slide on the ramp faces 26 which cause the tabs to arch perpendicular to the shifting direction between the guides 18. It is not until the openings 34 coincide with the detent noses 24 that the tabs 32, 32' are again able to fully extend, due to their flexibility, the detent noses 24 thereby engaging the openings 34 to thus produce the latch connection (FIG. 4).

The height of the detent noses dictates how strongly the tabs are arched, i.e. the higher the detent noses, the larger is the surface area for the force transmittable between the retaining parts. However, arching is in particular also defined by the thickness of the tabs. In the illustrated embodiment the height of the detent noses 24 is selected such that they just penetrate through the tabs 32, 32', resulting in a maximum surface area for the connecting force and optimally locking the connector in place to prevent accidental release. If namely the detent noses were to engage the openings only in part, the tabs and the detent noses could be bent out of place due to the moment acting on the engaging surface area when a high connecting force is involved. This would result in the engaging surface area no longer being oriented perpendicular to the connecting force and thus enabling the tabs to slip off the detent noses.

Preventing the tabs from slipping off the detent noses may be alternatively or additionally prevented by, for example, configuring a microserration 34 on the head 28 of the detent nose 24. Such a microserration is evident in a magnified detail in FIG. 4.

It will be appreciated that the embodiment of the gas bag module shown represents but one example of an application for the detent connection proposed. Numerous modifications are conceivable. For instance, the retaining parts with the guide elements and the detent noses could be provided just as well on the gas bag cover and the tabs on the housing.

In another embodiment the detent noses may be provided on the tabs instead of on the housing, the ramp face then needing to point in the other direction. The openings would then need to be provided in the housing and the cross-member eliminated so that on being inserted into the guides the tabs arch until the detent noses are able to engage the openings in the housing.

What is claimed is:

1. A detent connection for a gas bag cover of a vehicle occupant restraint system, said detent connection comprising:
   at least two retaining parts, one of said retaining parts including at least one detent nose and the other of said retaining parts having an opening to receive said detent nose to connect said two retaining parts;
   said detent nose being designed such that upon shifting of said two retaining parts relative to each other said other of said retaining parts is arched by a force applied to said other of said retaining parts by said detent nose acting substantially perpendicular to a shifting direction before said detent nose latches in said opening,
   said other of said retaining parts comprising a tab having said opening and said one of said retaining parts comprising a guide element by means of which said tab is guided,
   said guide element comprising a cross portion and two parallel spaced apart guide surfaces for engaging opposite sides of said tab,
   said detent nose being located between said two guide surfaces.

2. The detent connection as set forth in claim 1, wherein said cross portion has has a surface extending between said two guide surfaces, said tab engaging said surface of said cross portion when said opposite sides of said tab engage said two guide surfaces and said detent nose is in said opening.

3. A detent connection as set forth in claim 1, wherein said detent nose is provided with a micro serration to engage said tab to resist removal of said detent nose from said opening.

4. A detent connection as set forth in claim 1, wherein said guide element includes spaced apart surfaces that overlie lateral portions of said tab.

5. A gas bag module comprising a detent connection for a gas bag cover of a vehicle occupant restraint system, said detent connection comprising:
   at least two retaining parts, one of said retaining parts including at least one detent nose and the other of said retaining parts having an opening to receive said detent nose to connect said two retaining parts;
   said detent nose being designed such that upon shifting of said two retaining parts relative to each other said other of said retaining parts is arched by a force applied to said other of said retaining parts by said detent nose acting substantially perpendicular to a shifting direction before said detent nose latches in said opening,
   said other of said retaining parts comprising a tab having said opening and said one of said retaining parts comprising a guide element by means of which said tab is guided,
   said guide element comprising a cross portion and two parallel spaced apart guide surfaces for engaging opposite sides of said tab, said detent nose being located between said two guide surfaces.

6. A detent connection as set forth in claim 4, wherein said guide element includes spaced apart surfaces that overlie lateral portions of said tab.

7. A gas bag module having a housing and comprising a detent connection for a gas bag cover of a vehicle occupant restraint system, said detent connection comprising:
   at least two retaining parts, one of said retaining parts including at least one detent nose and the other of said retaining parts having an opening to receive said detent nose to connect said two retaining parts;
   said detent nose being designed such that upon shifting of said two retaining parts relative to each other said other of said retaining parts is arched by a force applied to said other of said retaining parts by said detent nose acting substantially perpendicular to a shifting direction before said detent nose latches in said opening,
   said other of said retaining parts being fixedly connected to said housing,
   said other of said retaining parts comprising a tab having said opening and said one of said retaining parts comprising a guide element by means of which said tab is guided,
   said guide element comprising a cross position and two parallel spaced apart guide surfaces for engaging opposite sides of said tab, said detent nose being located between said two guide surfaces.

8. A detent connection as set forth in claim 7, wherein said guide element includes spaced apart surfaces that overlie lateral portions of said tab.

* * * * *